US012617242B2

(12) United States Patent
Ishii

(10) Patent No.:  US 12,617,242 B2
(45) Date of Patent:      May 5, 2026

(54) PNEUMATIC TIRE

(71) Applicant: The Yokohama Rubber Co., LTD.,
Tokyo (JP)

(72) Inventor: Makoto Ishii, Tokyo (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 138 days.

(21) Appl. No.: 18/002,404

(22) PCT Filed: Jun. 24, 2021

(86) PCT No.: PCT/JP2021/023934
§ 371 (c)(1),
(2) Date: Dec. 19, 2022

(87) PCT Pub. No.: WO2021/261553
PCT Pub. Date: Dec. 30, 2021

(65) Prior Publication Data
US 2023/0234402 A1      Jul. 27, 2023

(30) Foreign Application Priority Data

Jun. 24, 2020    (JP) ................................. 2020-108616

(51) Int. Cl.
B60C 13/00              (2006.01)
(52) U.S. Cl.
CPC .................................. B60C 13/001 (2013.01)
(58) Field of Classification Search
CPC .............................. B60C 13/001; B60C 13/00
See application file for complete search history.

(56) References Cited

U.S. PATENT DOCUMENTS

D96,796 S  *  9/1935  Anderson .................... D12/605
2012/0273101 A1* 11/2012  Iwabuchi .................. B60C 5/00
                                                                  152/151
2020/0070591 A1*  3/2020  Debordeaux ......... B60C 13/001

FOREIGN PATENT DOCUMENTS

JP        2011-126335 A      6/2011
JP        2013-035313 A      2/2013
JP        2014136487 A  *  7/2014
JP        2019119268 A  *  7/2019
WO      2018-162308 A1      9/2018

OTHER PUBLICATIONS

JP 2014-136487 Machine Translation; Hirosue, Eisuke (Year: 2014).*
JP 2019-119268 Machine Translation; Fujita, Masayuki (Year: 2019).*

* cited by examiner

*Primary Examiner* — Justin R Fischer
*Assistant Examiner* — Nicholas J Weiler
(74) *Attorney, Agent, or Firm* — Thorpe North & Western

(57)              ABSTRACT
In a pneumatic tire including a decorative portion on an outer surface of a sidewall portion, the decorative portion includes a plurality of decorative elements arranged in a step-like manner along reference lines parallel to each other, each of the decorative elements forms a hexagon in which three regions forming a parallelogram are disposed sharing adjacent sides of the three regions, a plurality of ridges extending in the same direction is formed in each of the regions of each of the decorative elements, and inclination directions of the ridges are different from one another in the three regions forming each of the decorative elements.

10 Claims, 7 Drawing Sheets

PNEUMATIC TIRE

TECHNICAL FIELD

The present technology relates to a pneumatic tire and particularly relates to a pneumatic tire that can provide inconspicuous unevenness of a sidewall portion, improved decorativeness and visibility of a sidewall portion, and reduced drawing time at the time of designing the tire.

BACKGROUND ART

To make unevenness of the sidewall portion inconspicuous, in a pneumatic tire, a serration formed of a large number of ridges is formed on a sidewall portion (see, for example, Japan Unexamined Patent Publication No. 2013-035313 A and International Patent Publication No. WO 2018/162308). In disposing the serration on the sidewall portion, typically, the size and curvature of the serration is changed according to a tire size, and then the serration is annularly disposed along a tire circumferential direction. Unfortunately, such changes may take a large amount of drawing time at the time of designing the tire.

SUMMARY

The present technology provides a pneumatic tire that can provide inconspicuous unevenness of a sidewall portion, improved decorativeness and visibility of the sidewall portion, and reduced drawing time at the time of designing the tire.

A pneumatic tire according to an embodiment of the present technology includes a decorative portion on an outer surface of a sidewall portion. In the pneumatic tire, the decorative portion includes a plurality of decorative elements arranged in a step-like manner along reference lines parallel to each other, each of the decorative elements forms a hexagon in which three regions forming a parallelogram are disposed sharing adjacent sides of the three regions, a plurality of ridges extending in the same direction is formed in each of the regions of each of the decorative elements, and inclination directions of the ridges are different from one another in the three regions forming each of the decorative elements.

According to an embodiment of the present technology, in a pneumatic tire including a decorative portion on an outer surface of a sidewall portion, the decorative portion includes a plurality of decorative elements arranged in a step-like manner along reference lines parallel to each other, each of the decorative elements forms a hexagon in which three regions forming a parallelogram are disposed sharing adjacent sides of the three regions, a plurality of ridges extending in the same direction is formed in each of the regions of each of the decorative elements, and inclination directions of the ridges are different from one another in the three regions forming each of the decorative elements. This can improve poor appearance of the sidewall portion. In particular, the hexagonal decorative element has an optical illusion effect, allowing the decorativeness of the sidewall portion to be improved. In addition, a difference in contrast of light reflection caused by sparsity or density between the pattern portion in which the hexagonal decorative elements are gathered and a flat surface around a brand logo in the decorative portion increases attention to the sidewall portion and can improve the visibility of the sidewall portion (particularly the brand logo). Furthermore, since the plurality of decorative elements is arranged along the reference lines parallel to each other, changing the size and curvature of the decoration in accordance with the tire size is unnecessary unlike the related art, and the above-described effects can be sufficiently obtained without such changes. This can reduce drawing time of the sidewall portion at the time of designing the tire.

In a pneumatic tire according to an embodiment of the present technology, preferably, each of the regions of the decorative elements is preferably separated by a boundary portion formed of a protrusion portion or a recess portion, and the ridges in each of the regions of the decorative elements terminate at the boundary portion. This clarifies the boundary between each of the regions of the decorative elements and can effectively improve the decorativeness and visibility of the sidewall portion.

An intersection angle between the ridges is preferably from 30° to 90°. This can effectively improve the unevenness of the sidewall portion as well as the decorativeness and visibility of the sidewall portion.

A height of the ridges is preferably from 0.1 mm to 0.3 mm. This can effectively improve the unevenness of the sidewall portion as well as the decorativeness and visibility of the sidewall portion.

A width of the boundary portion is preferably from 0.5 mm to 1.5 mm. This can effectively improve the decorativeness and visibility of the sidewall portion.

A height or a depth of the boundary portion is preferably from 0.1 mm to 0.5 mm. This can effectively improve the decorativeness and visibility of the sidewall portion.

BRIEF DESCRIPTION OF DRAWINGS

FIG. 2A illustrates a pattern portion in which a plurality of decorative elements is gathered. FIG. 2B schematically illustrates one decorative element.

DETAILED DESCRIPTION

Figure 1:
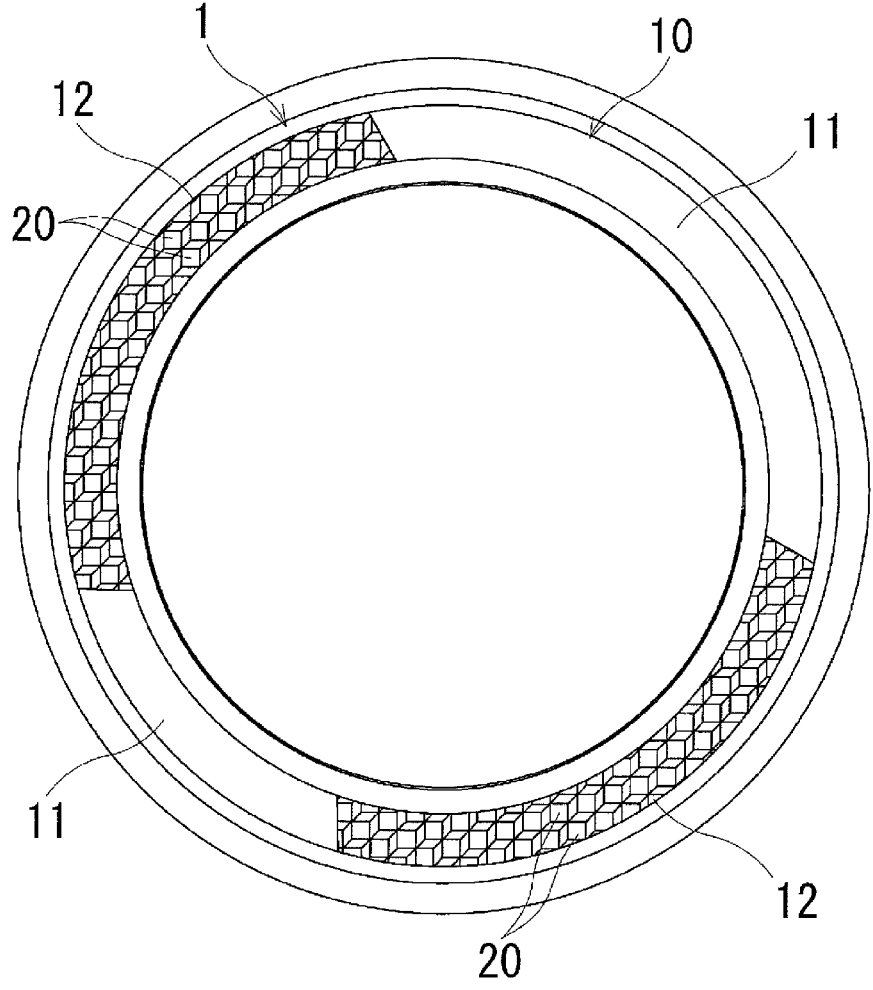
FIG. 1 is a side view illustrating an example of a pneumatic tire according to an embodiment of the present technology.

Configurations of the present technology will be described in detail below with reference to the accompanying drawings. FIGS. 1 to 3 illustrate an example of a pneumatic tire according to an embodiment of the present technology.

As illustrated in FIG. 1, a decorative portion 10 having an annular shape in the tire circumferential direction is formed on an outer surface of a sidewall portion 1 of the pneumatic tire. The decorative portion 10 includes a display portion 11 in which a manufacturer name of the tire or a brand logo are formed and a pattern portion 12 in which a plurality of decorative elements 20 is gathered to form a pattern. The display portion 11 and the pattern portion 12 are alternately arranged in the tire circumferential direction. Although ridges 31 to 33, which will be described below, are formed in the pattern portion 12, the ridges 31 to 33 are omitted in FIG. 1 to make a pattern according to an embodiment of the present technology visually easy to understand.

Figures 2A, 2B:
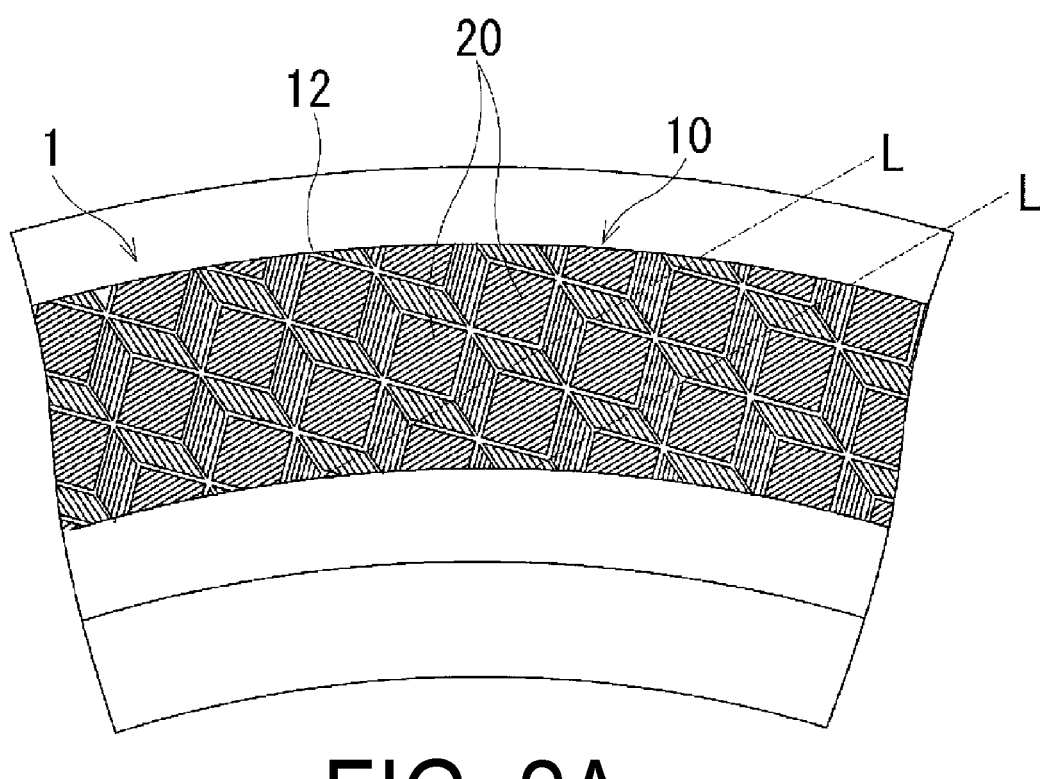
FIGS. 2A and 2B are enlarged side views illustrating a main portion of the pneumatic tire of FIG. 1.
Figure 3:
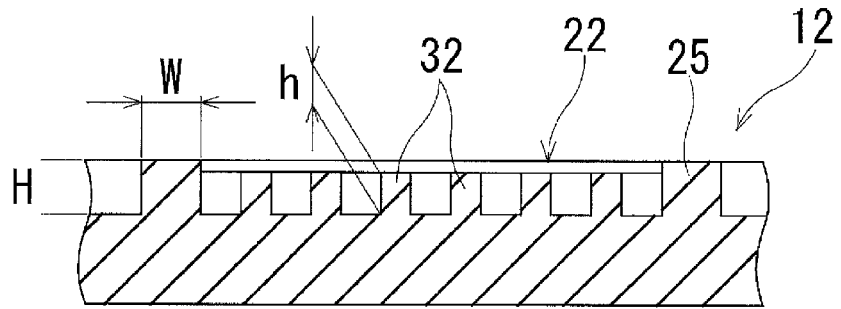
FIG. 3 is a cross-sectional view illustrating one region of a decorative element formed on a sidewall portion of the pneumatic tire of FIG. 1.

As illustrated in FIG. 2A, the plurality of decorative elements 20 have the same shape in the pattern portion 12. Further, the plurality of decorative elements 20 is arranged in a step-like manner along a direction that is inclined with respect to the tire circumferential direction. The plurality of decorative elements 20 arranged in a step-like manner is continuously disposed in a plurality of rows in the tire radial direction. Thus disposing the plurality of decorative elements 20 in a step-like manner to form a row of stepped patterns, and further disposing a plurality of the rows of stepped patterns adjacently in the tire radial direction forms patterns of a step group including the plurality of the rows of stepped patterns on the pattern portion 12.

As illustrated in FIG. 2B, a decorative element 20 includes three regions 21 to 23 that form a parallelogram. Here, "parallelogram" in an embodiment of the present technology means a figure including a so-called parallelogram, a rhomboid, and a square. FIG. 2B illustrates an example in which the region 21 is a square and the regions 22 and 23 are parallelograms. The regions 21 to 23 are disposed sharing adjacent sides (boundary portions 25 described below). By disposing the three regions 21 to 23 adjacently in this way, the decorative element 20 forms a hexagon as a whole. This hexagon is a figure formed by six sides and vertices when a contour line of the decorative element 20 formed of the three regions 21 to 23 in a plan view is considered.

The three regions 21 to 23 forming each decorative element 20 each forms a parallelogram in a plan view, and the combination of these regions 21 to 23 visually forms a cube shape. Such a cube shape (hexagonal decorative element 20) is actually a flat shape but exerts an optical illusion effect by which a three-dimensional shape appears to be formed.

Further, the plurality of decorative elements 20 is arranged along reference lines L parallel to each other. The reference lines L are lines formed by connecting one corresponding point of each of the plurality of decorative elements 20 continuously arranged in a step-like manner and are, for example, lines formed by connecting one corner portion of the region 21 (square) as illustrated in FIG. 2A. When the plurality of decorative elements 20 is disposed along the reference lines L, the plurality of decorative elements 20 is continuously arranged in a step-like manner along a direction that is inclined with respect to the tire circumferential direction but is not annularly disposed along the tire circumferential direction. Such a disposition of the decorative elements 20 enables all the decorative elements 20 disposed in the pattern portion 12 to have the same shape.

On the other hand, in a known pneumatic tire in which a plurality of decorative elements having a specific shape is regularly disposed along the tire circumferential direction or the tire radial direction, typically, the size and curvature of the decorative elements are changed according to the tire size, and the decorative elements are annularly disposed in the tire circumferential direction. The change of the size and curvature of the decorative elements causes the plurality of decorative elements not to be arranged along parallel reference lines. Further, the decorative element located on the inner side in the tire radial direction and the decorative element located on the outer side in the tire radial direction are different in size, and all the decorative elements do not have the same shape.

In the regions 21 to 23 forming each of the decorative elements 20, a plurality of ridges 31 to 33 extending in the same direction in each region is formed. The ridges 31 to 33 are formed protruding from the outer surface of the sidewall portion 1. The ridges 31 to 33 basically have the same height and width. The number of ridges 31 to 33 formed in each of the regions 21 to 23 may be the same or may be different. Preferably, the ridges 31 to 33 are equally spaced within each region.

Further, the inclination directions of the ridges 31 to 33 disposed in the adjacent regions are different from one another. Specifically, the ridges 31 in the region 21 and the ridges 32 in the region 22 extend in directions crossing each other, the ridges 31 in the region 21 and the ridges 33 in the region 23 extend in directions crossing each other, and the ridges 32 in the region 22 and the ridges 33 in the region 23 extend in directions crossing each other. That is, one decorative element 20 has three inclination directions.

In such a decorative element 20, the regions 21 to 23 are separated by the boundary portion 25 formed of a protrusion portion. In other words, the boundary portion 25 forms a side that is shared by the regions 21 to 23. Further, the boundary portion 25 is formed protruding from the outer surface of the sidewall portion 1. All the ridges 31 to 33 in each of the regions 21 to 23 terminate at the boundary portion 25. Note that even in a case in which the boundary portion 25 is not formed in the decorative element 20, the ridges 31 to 33 in each of the regions 21 to 23 are not connected to one another.

In the pneumatic tire described above, the decorative portion 10 includes a plurality of decorative elements 20 arranged in a step-like manner along reference lines L parallel to each other, each of the decorative elements 20 forms a hexagon in which the three regions 21 to 23 forming a parallelogram are disposed sharing adjacent sides of the three regions, a plurality of ridges 31 to 33 extending in the same direction is formed in each of the regions 21 to 23 of each of the decorative elements 20, and inclination directions of the ridges 31 to 33 are different from one another in the three regions 21 to 23 forming each of the decorative elements 20. This can make unevenness of the sidewall portion 1 inconspicuous. In particular, since the hexagonal decorative element 20 has an optical illusion effect, the decorativeness of the sidewall portion 1 can be improved. In addition, a difference in contrast of light reflection caused by sparsity or density between the pattern portion 12 in which the hexagonal decorative elements 20 are gathered and a flat surface around a brand logo in the decorative portion 10 increases attention to the sidewall portion 1 and can improve the visibility of the sidewall portion 1 (particularly the brand logo). Furthermore, since the plurality of decorative elements 20 is arranged along the reference lines L parallel to each other, changing the size and curvature of the decoration in accordance with the tire size is unnecessary unlike the related art, and the above-described effects can be sufficiently obtained without such changes. This can reduce the drawing time of the sidewall portion 1 at the time of designing the tire.

Furthermore, each of the regions 21 to 23 of the decorative element 20 is separated by the boundary portion 25, and the ridges 31 to 33 in each of the regions 21 to 23 of the decorative element 20 terminate at the boundary portion 25. This clarifies a boundary between each of the regions 21 to 23 of the decorative element 20 and can effectively improve the decorativeness and visibility of the sidewall portion 1.

In the pneumatic tire described above, a width W of the boundary portion 25 (see FIG. 3) is preferably from 0.5 mm to 1.5 mm and more preferably from 0.7 mm to 1.1 mm. Appropriately setting the width W of the boundary portion 25 in this manner clarifies the boundary between each of the regions 21 to 23 of the decorative element 20 and can effectively improve the decorativeness and visibility of the sidewall portion 1.

Here, the width W of the boundary portion 25 of less than 0.5 mm makes the boundary between each of the regions 21 to 23 of the decorative element 20 unclear and cannot sufficiently obtain the effect of improving the decorativeness and visibility of the sidewall portion 1. On the contrary, the width W of the boundary portion 25 of greater than 1.5 mm makes the boundary portion 25 excessively conspicuous and cannot obtain good visibility.

Further, a height H of the boundary portion 25 (see FIG. 3) is preferably from 0.1 mm to 0.5 mm and more preferably from 0.2 mm to 0.4 mm. Appropriately setting the height H the boundary portion 25 in this manner clarifies the boundary between each of the regions 21 to 23 of the decorative element 20 and can effectively improve the decorativeness and visibility of the sidewall portion 1.

Here, the height H of the boundary portion 25 of less than 0.1 mm makes the boundary between each of the regions 21 to 23 of the decorative element 20 unclear and cannot sufficiently obtain the effect of improving the decorativeness and visibility of the sidewall portion 1. On the contrary, the height H of the boundary portion 25 of greater than 0.5 mm makes the boundary portion 25 excessively conspicuous and cannot obtain good visibility.

In the pneumatic tire described above, intersection angles $\theta a$ to $\theta c$ (see FIG. 2B) of the ridges 31 to 33 are preferably from 30° to 90°. At this time, the intersection angles $\theta a$ to $\theta c$ mean an angle on the acute angle side of the ridges 31 to 33 formed in the adjacent regions 21 to 23 of the decorative element 20. In FIG. 2B, the intersection angle $\theta a$ between the ridge 31 in the region 21 and the ridge 32 in the region 22 is 90°, the intersection angle $\theta b$ between the ridge 31 in the region 21 and the ridge 33 in the region 23 is 45°, and the intersection angle $\theta c$ between the ridge 32 in the region 22 and the ridge 33 in the region 23 is 45°. Appropriately setting the intersection angles $\theta a$ to $\theta c$ of the ridges 31 to 33 in this manner effectively improves the unevenness of the sidewall portion 1 and can effectively improve the decorativeness and visibility of the sidewall portion 1.

Further, a height h of the ridges 31 to 33 (see FIG. 3) is preferably from 0.1 mm to 0.3 mm. Furthermore, the height h of each of the ridges 31 to 33 is preferably lower than the height H of the boundary portion 25. Appropriately setting the height h of the ridges 31 to 33 in this manner can effectively improve the unevenness of the sidewall portion 1 and can effectively improve the decorativeness and visibility of the sidewall portion 1.

Here, the height h of the ridges 31 to 33 of less than 0.1 mm cannot sufficiently obtain the effect of improving unevenness of the sidewall portion 1. On the contrary, the height h of the ridges 31 to 33 of greater than 0.3 mm makes the ridges 31 to 33 excessively conspicuous and cannot obtain good visibility.

Figure 4:
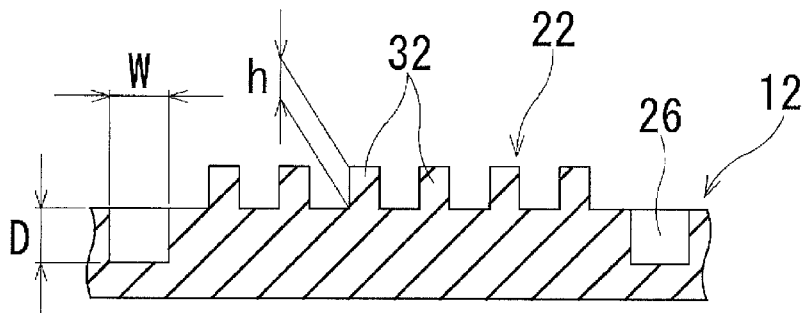
FIG. 4 is a cross-sectional view illustrating a region of a decorative element formed on a sidewall portion of a modified example of a pneumatic tire according to an embodiment of the present technology.

FIG. 4 illustrates one region of the decorative element formed on the sidewall portion of a modified example of the pneumatic tire according to the embodiment of the present technology. In FIG. 3, the regions 21 to 23 of the decorative element 20 are separated by the boundary portion 25 formed of a protrusion portion. In FIG. 4, the regions are separated by a boundary portion 26 formed of a recess portion. The pneumatic tire according to the embodiment illustrated in FIG. 4 has the same structure as the pneumatic tire of FIGS. 1 to 3 except that the boundary portion 26 formed of a recess portion is formed in the pattern portion 12. The boundary portion 26 is recessed from the outer surface of the sidewall portion 1. Further, a depth D of the boundary portion 26 (see FIG. 4) is preferably from 0.1 mm to 0.5 mm and more preferably from 0.2 mm to 0.4 mm.

Figure 5:
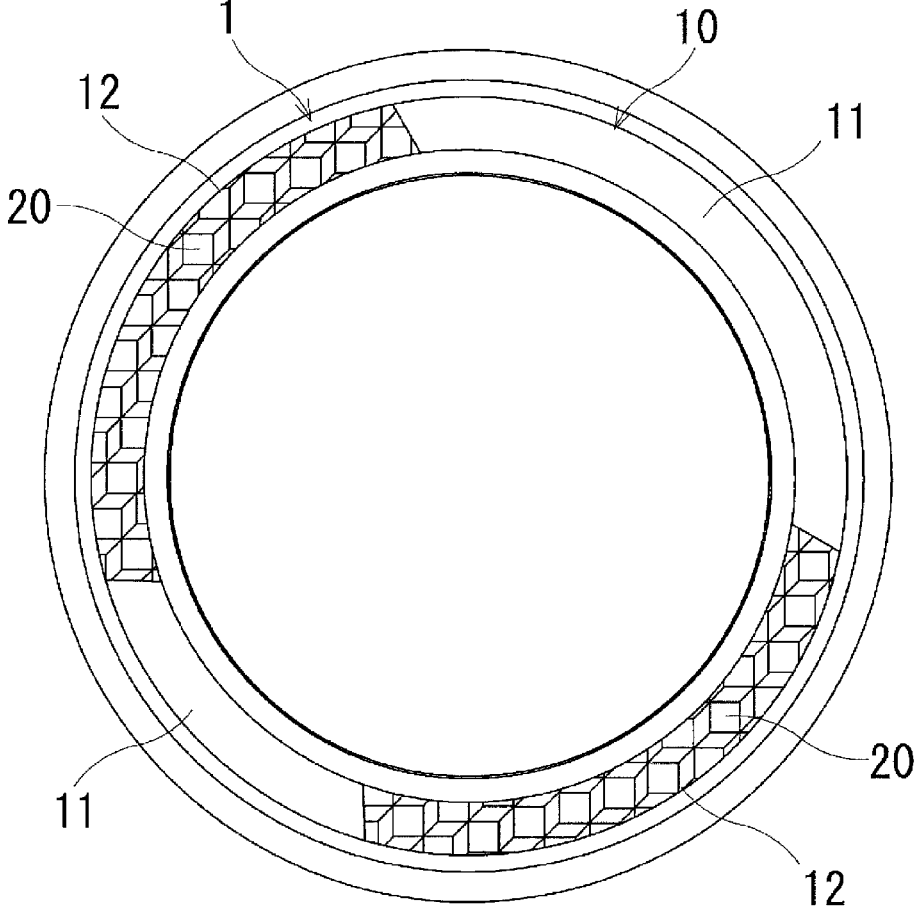
FIG. 5 is a side view illustrating another modified example of a pneumatic tire according to an embodiment of the present technology.
Figure 6:
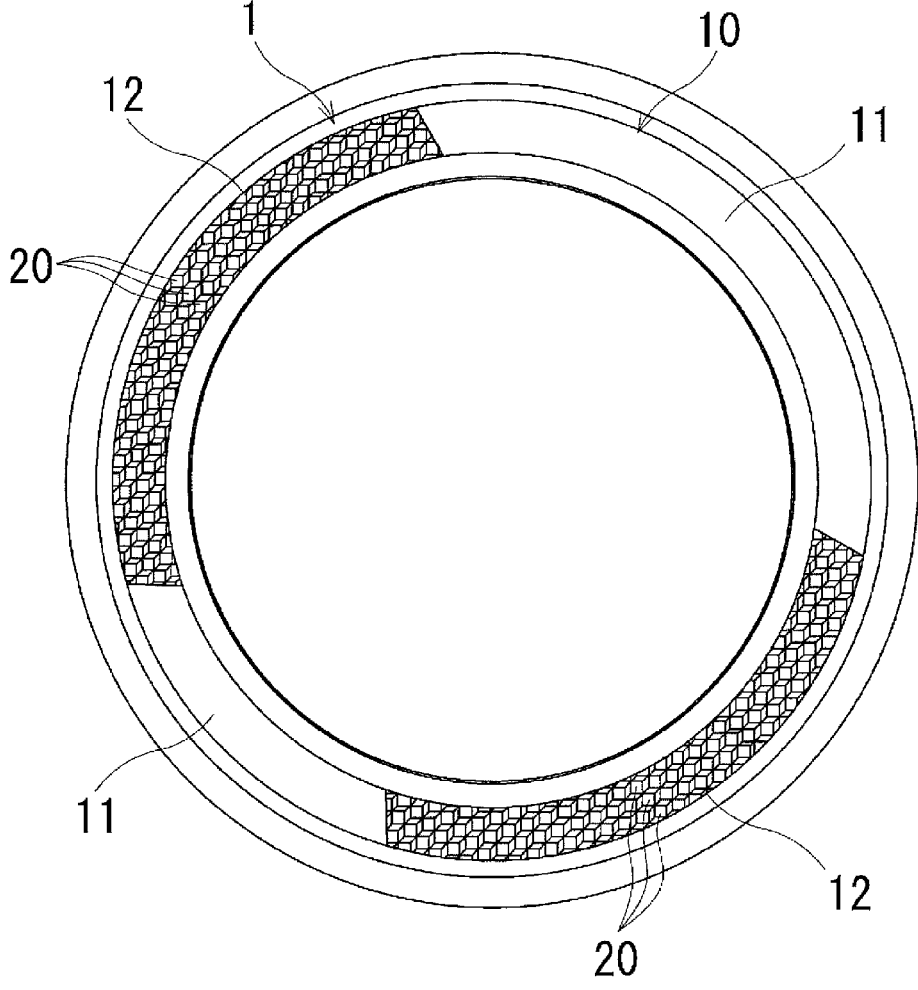
FIG. 6 is a side view illustrating another modified example of a pneumatic tire according to an embodiment of the present technology.

FIGS. 5 and 6 each illustrate another modified example of the pneumatic tire according to the embodiment of the present technology. In FIG. 1, in the pattern portion 12, two rows of stepped patterns (the plurality of decorative elements 20 continuously arranged in a step-like manner) are disposed in the tire radial direction. However, in FIG. 5, one row of stepped patterns is disposed in the tire radial direction, and in FIG. 6, three rows of stepped patterns are disposed in the tire radial direction. The pneumatic tires of the embodiments of FIGS. 5 and 6 both have the same structure as the pneumatic tire of FIGS. 1 to 3 except that the number of rows of stepped patterns in the tire radial direction is different. To improve the balance of the cube shape (hexagonal decorative element 20), in the pattern portion 12, the number of rows of stepped patterns in the tire radial direction is preferably 1 to 3 rows and is more preferably 2 rows. Here, the number of rows of stepped patterns in the tire radial direction is the maximum number of the decorative element 20 in the tire radial direction disposed in the pattern portion 12, targeting at the hexagonal decorative element 20 whose entirety is contained within the pattern portion 12. Note that the ridges 31 to 33 are formed in the pattern portion 12, but the ridges 31 to 33 are omitted in FIGS. 5 and 6 to make a pattern according to an embodiment of the present technology visually easy to understand.

EXAMPLES

The tires according to Conventional Example and Examples 1 to 3 were manufactured. The pneumatic tires have a tire size of 195/60R16 and have the decorative portion on the outer surface of the sidewall portion. The tires are set for the pattern of the pattern portion, the width of the boundary portion, and the number of rows of the stepped pattern in the tire radial direction, as indicated in Table 1.

Figure 7:
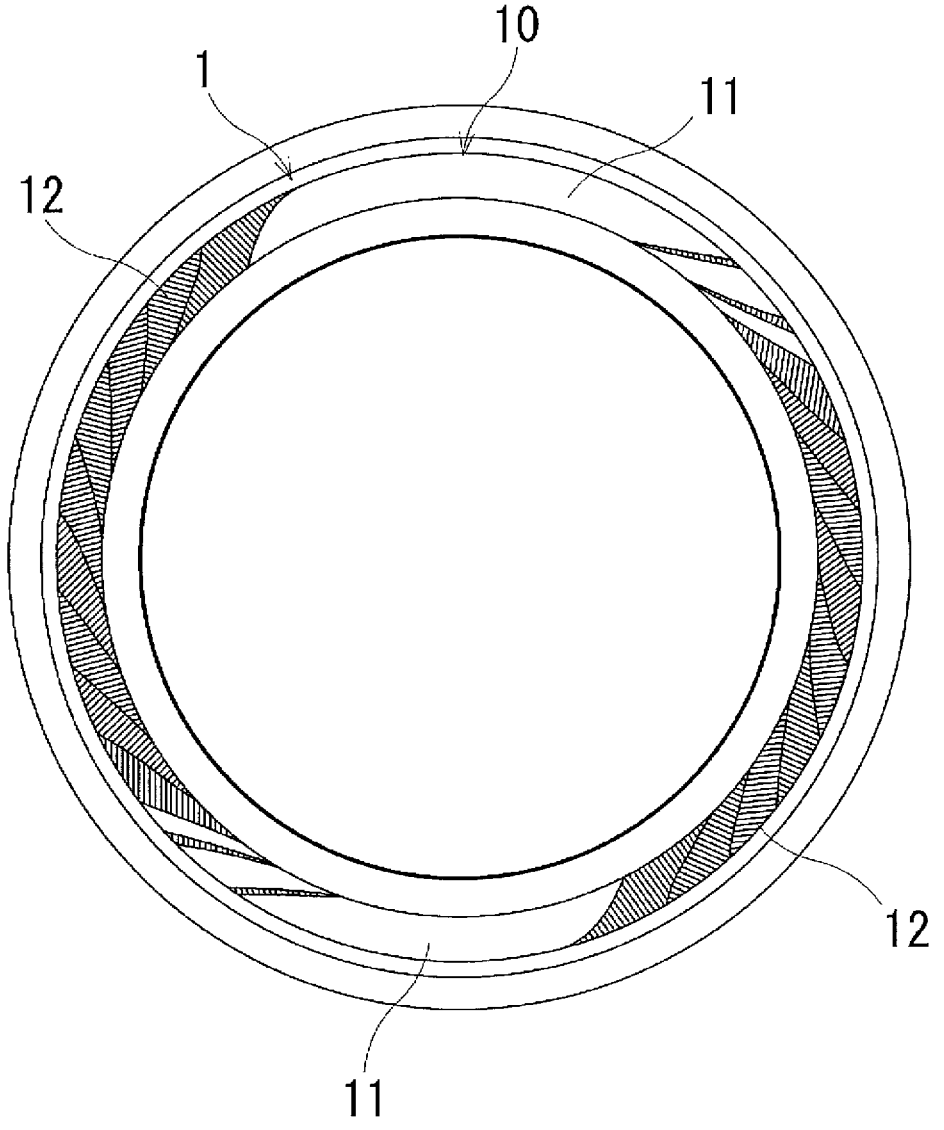
FIG. 7 is a side view illustrating a known pneumatic tire.

In Conventional Example, the pattern of the pattern portion illustrated in FIG. 7 is employed, and only a plurality of ridges having a height of 0.2 mm is disposed in the pattern portion. In Example 1, the pattern of the pattern portion illustrated in FIG. 1 is employed. In Example 2, the pattern of the pattern portion illustrated in FIG. 5 is employed. In Example 3, the pattern of the pattern portion illustrated in FIG. 6 is employed. Additionally, in Examples 1 to 3, each region of the decorative element is separated by the boundary portion formed of a protrusion portion, the ridges of each region of the decorative element had a structure in which the ridges terminate at the boundary portion, the height of the ridges is set to 0.2 mm, and the height of the boundary portion is set to 0.3 mm.

For these test tires, difficulty in recognizing the unevenness, decorativeness of the pattern portion, visibility of the display portion, and drawing time of the pattern portion were evaluated using test methods described below, and the results are indicated in Table 1.

Unevenness Recognition Difficulty:

For each test tire, a tester visually recognized the unevenness of the sidewall portion and evaluated the difficulty in recognizing the unevenness. Evaluation results are expressed as index values with the value of Conventional Example being defined as 100. Larger index values indicate that recognition of the unevenness is more difficult, and the unevenness is less conspicuous.

Pattern Portion Decorativeness:

For each test tire, a tester visually recognized the sidewall portion, and evaluated the decorativeness of the pattern portion. Evaluation results are expressed as index values with the value of Conventional Example being defined as 100. Larger index values indicate superior decorativeness.

Display Portion Visibility:

For each test tire, a tester visually recognized the sidewall portion, and evaluated the visibility of the brand logo of the display portion. Evaluation results are expressed as index values with the value of Conventional Example being defined as 100. Larger index values indicate superior visibility of the brand logo.

Pattern Portion Drawing Time:

For each test tire, time (minutes) required to draw the pattern portion of the sidewall portion was measured. Evaluation results are expressed as index values with the value of Conventional Example being defined as 100. Smaller index values indicate shorter drawing time.

TABLE 1

| | Conventional Example | Example 1 | Example 2 | Example 3 |
|---|---|---|---|---|
| Pattern of pattern portion | FIG. 7 | FIG. 1 | FIG. 5 | FIG. 6 |
| Width of boundary portion (mm) | — | 0.9 | 1.5 | 0.6 |
| Number of rows of stepped pattern in tire radial direction | — | 2 | 1 | 3 |
| Difficulty in recognizing unevenness | 100 | 105 | 105 | 105 |
| Decorativeness of pattern portion | 100 | 115 | 105 | 110 |
| Visibility of display portion | 100 | 110 | 105 | 115 |
| Drawing time of pattern portion | 100 | 85 | 80 | 90 |

As can be seen from Table 1, Examples 1 to 3 had improved the difficulty in identifying unevenness, the decorativeness of the pattern portion, the visibility of the display portion, and drawing time of pattern portion compared with those of Conventional Example. In particular, in Example 1, the decorative elements formed in the pattern portion were well balanced in size compared with those of Examples 2 and 3.

The invention claimed is:

1. A pneumatic tire, comprising
   a decorative portion on an outer surface of a sidewall portion,
   the decorative portion comprising a plurality of decorative elements arranged in a step-like manner along reference lines parallel to each other,
   each of the decorative elements forming a hexagon in which three regions forming a parallelogram are disposed sharing adjacent sides of the three regions, the parallelogram of the three regions including at least two different parallelogram shapes, a plurality of ridges extending in the same direction being formed in each of the regions of each of the decorative elements, and
   inclination directions of the ridges being different from one another in the three regions forming each of the decorative elements, wherein
   each of the regions of the decorative elements is separated by a boundary portion formed of a protrusion portion or a recess portion,
   the ridges in each of the regions of the decorative elements terminate at the boundary portion, and
   each of the regions of the decorative elements is separated by a boundary portion and the ridges in each of the regions of each of the decorative elements extends from the boundary portion on one side to a boundary portion on an opposite side.

2. The pneumatic tire according to claim 1, wherein an intersection angle between the ridges is from 30° to 90°.

3. The pneumatic tire according to claim 1, wherein a height of the ridges is from 0.1 mm to 0.3 mm.

4. The pneumatic tire according to claim 1, wherein a width of the boundary portion is from 0.5 mm to 1.5 mm.

5. The pneumatic tire according to claim 4, wherein a height or a depth of the boundary portion is from 0.1 mm to 0.5 mm.

6. The pneumatic tire according to claim 1, wherein a height or a depth of the boundary portion is from 0.1 mm to 0.5 mm.

7. The pneumatic tire according to claim 1, wherein one of the at least two different parallelogram shapes is a square.

8. The pneumatic tire according to claim 1, wherein the plurality of ridges are disposed between boundary portions defining each of the regions.

9. The pneumatic tire according to claim 1, wherein in at least one of the regions, the plurality of ridges extend parallel to at least one of the boundary portions.

10. A pneumatic tire, comprising
   a decorative portion on an outer surface of a sidewall portion,
   the decorative portion comprising a plurality of decorative elements arranged in a step-like manner along reference lines parallel to each other,
   each of the decorative elements forming a hexagon in which three regions forming a parallelogram are disposed sharing adjacent sides of the three regions, the parallelogram of the three regions including at least two different parallelogram shapes,
   a plurality of ridges extending in the same direction being formed in each of the regions of each of the decorative elements, and
   inclination directions of the ridges being different from one another in the three regions forming each of the decorative elements, wherein
   each of the regions of the decorative elements is separated by a boundary portion formed of a protrusion portion or a recess portion,
   the ridges in each of the regions of the decorative elements terminate at the boundary portion, and
   each of the regions of the decorative elements is separated by a boundary portion having a cross-sectional width greater than a cross-sectional width of an individual one of the ridges.

* * * * *